(12) United States Patent
McBrearty et al.

(10) Patent No.: US 12,289,174 B1
(45) Date of Patent: Apr. 29, 2025

(54) SYSTEM AND METHOD FOR SUPPORTING AN INTEGRATED SPEAKER PORTAL IN AN EVENT DATA MANAGEMENT SYSTEM

(71) Applicant: Veeva Systems Inc., Pleasanton, CA (US)

(72) Inventors: Krista McBrearty, Livermore, CA (US); Brett Adam Norton, Fair Lawn, NJ (US); Srinivasa S. Davuluri, San Ramon, CA (US); Jay H. Hartley, San Ramon, CA (US); Arno Sosna, Pleasanton, CA (US); Kalaivani Sengottaiyan, San Jose, CA (US); Victor Havin, Foster City, CA (US); Kimberly Berger, Penn Valley, PA (US)

(73) Assignee: Veeva Systems Inc., Pleasanton, CA (US)

( * ) Notice: Subject to any disclaimer, the term of this patent is extended or adjusted under 35 U.S.C. 154(b) by 0 days.

(21) Appl. No.: 18/063,530

(22) Filed: Dec. 8, 2022

(51) Int. Cl.
*G06F 3/048* (2013.01)
*H04L 12/18* (2006.01)

(52) U.S. Cl.
CPC ...... *H04L 12/1822* (2013.01); *H04L 12/1818* (2013.01)

(58) Field of Classification Search
CPC .................. H04L 12/1822; H04L 12/1818
See application file for complete search history.

(56) References Cited

U.S. PATENT DOCUMENTS

| | | | |
|---|---|---|---|
| 8,503,924 B2 * | 8/2013 | Dion .................. | G09B 7/00 434/323 |
| 8,750,782 B2 * | 6/2014 | Scandura ............. | G09B 7/00 434/350 |
| 10,785,224 B2 * | 9/2020 | Kallman .............. | G06F 9/542 |
| 10,937,005 B1 * | 3/2021 | Narayanaswamy ..... | H04N 7/15 |
| 11,303,463 B1 * | 4/2022 | Kallman ............. | H04L 12/1822 |
| 2005/0132207 A1 * | 6/2005 | Mourad .............. | G06F 21/10 713/189 |
| 2008/0318197 A1 * | 12/2008 | Dion .................. | G09B 7/00 434/365 |
| 2011/0159472 A1 * | 6/2011 | Eck .................... | G09B 7/02 434/322 |
| 2013/0218882 A1 * | 8/2013 | McConnell ....... | G06F 16/24524 707/E17.014 |
| 2015/0100363 A1 * | 4/2015 | Bishop ............... | G06F 16/958 705/7.15 |
| 2017/0118271 A1 * | 4/2017 | Reyes ............... | H04L 65/1089 |

(Continued)

*Primary Examiner* — David Phantana-angkool (57) ABSTRACT

The integrated speaker portal in an event data management system described is capable of aligning controlled event content in a controlled content repository and providing an interface for complete speaker management. Event information containing logistics of upcoming and past webinars, approved event presentations that are used at speaking engagements, and the handling of speakers' engagement contracts are effectively managed through the integrated speaker portal. Each of the event details, approved event content, and associated event contracts are displayed in response to a request and available for download in read-only format. When event content is updated in the controlled content repository, the latest version is pushed to the speaker so that only the latest version of the controlled event content can be shared.

19 Claims, 7 Drawing Sheets

(56) References Cited

U.S. PATENT DOCUMENTS

| | | | | |
|---|---|---|---|---|
| 2018/0189736 A1* | 7/2018 | Guo | ........................ | G06Q 10/06 |
| 2019/0019428 A1* | 1/2019 | Pulido | ...................... | G09B 7/00 |
| 2022/0317822 A1* | 10/2022 | Fong | ........................ | G06F 9/451 |
| 2023/0012141 A1* | 1/2023 | Kamath | ................. | G06F 3/0482 |
| 2023/0029144 A1* | 1/2023 | Fong | ........................ | H04L 51/04 |
| 2023/0042345 A1* | 2/2023 | Solmssen | .............. | G06Q 30/018 |
| 2023/0056578 A1* | 2/2023 | Oetting | .................... | G06F 16/78 |
| 2023/0101224 A1* | 3/2023 | Singh | ................. | G06F 9/44505 |
| | | | | 707/770 |
| 2023/0246924 A1* | 8/2023 | Paul | ...................... | G06F 3/0482 |
| | | | | 715/753 |
| 2023/0289740 A1* | 9/2023 | De Pano | ............... | H04L 51/216 |
| 2023/0308303 A1* | 9/2023 | Jorasch | ............... | H04L 65/1093 |
| | | | | 709/204 |

* cited by examiner

SPEAKER PORTAL ⓘ For assistance email support@domain.com or call 555.555.5555

- Events
- Contracts
- Content ← 601

Content ← 602

🔍 Search Content

Filter — Show All ← 603
Sort by — Display Name ← 604

Chiocap 2021 RBE Speaker Session ← 605
Cholecap Efficacy ← 606
PDF 3MB ← 607
Last Modified: Sept 15, 2021 ← 608
⬇ Download ← 609

Chiocap 2021 Speaking Session
Cholecap
PDF 1MB
ⓘ NEW! Updated: May 1, 2022
⬇ Download

Chiowcap 2022 RBE Speaker Session
Cholecap Efficacy
PDF 3MB
Last Modified: Jan 15, 2022
⬇ Download

Chiowcap 2022 Speaking Session
Cholecap
PPT 1MB
Last Modified: Mar 27, 2022

▼eeva
Privacy Policy | Terms of Use

600

SYSTEM AND METHOD FOR SUPPORTING AN INTEGRATED SPEAKER PORTAL IN AN EVENT DATA MANAGEMENT SYSTEM

CROSS-REFERENCE TO RELATED APPLICATIONS

The present application relates to U.S. Pat. No. 9,055,023, issued Jun. 9, 2015, which is incorporated by reference herein for all purposes.

TECHNICAL FIELD

The present disclosure relates generally to a user programmatic interface for supporting an integrated speaker portal in an event data management system.

BACKGROUND

Physicians can be broadly separated into different tiers. The entry tier consists of newly licensed health care providers (HCPs) that do not have much experience yet. The next tier consists of more expert HCPs that have been practicing for a number of years in their respective fields. These more experienced HCPs are coveted and contracted to speak on behalf of pharmaceutical or life science device companies to educate the medical community on the benefits, risks and best practices of their product.

SUMMARY

Embodiments disclosed in the present document provide a robust and integrated machine-implemented speaker portal used in conjunction with an event management system capable of aligning controlled content in a controlled content repository to properties of an event, that provides complete speaker management.

Embodiments disclosed in the present document provide a machine-implemented method for implementing and using an integrated speaker portal. The method comprises: establishing a controlled content repository, the controlled content repository being securely and controllably accessed; establishing an access protocol for providing available approved event content in the integrated speaker portal, wherein the access protocol includes at least one first set of alignment rules that ensure a first user possesses the qualifications to act as a speaker; obtaining information associated to the first user from an information management system, the information management system facilitating the generation and maintenance of approved event content and data; verifying the first user complies with the first set of alignment rules for providing access to available approved event content in the integrated speaker portal using the obtained information corresponding to the first user from the information management system; obtaining approved event content from the controlled content repository upon verification of the first set of alignment rules; aligning the approved event content obtained from the controlled content repository with the obtained information corresponding to the first user from the information management system; and displaying a plurality of items on a user interface, wherein at least one of said plurality of items displayed is approved event content from the controlled content repository previously made available to the first user.

BRIEF DESCRIPTION OF THE DRAWINGS

For a more complete understanding of the present application and its advantages, references are now made to the following description taken in conjunction with the accompanying drawings, in which like reference numbers indicate like features.

Although similar reference numbers may be used to refer to similar elements for convenience, it can be appreciated that each of the various example embodiments may be considered to be distinct variations.

The present embodiments will now be described hereinafter with reference to the accompanying drawings, which form a part hereof, and which illustrate example embodiments which may be practiced. As used in the disclosures and the appended claims, the terms "embodiment" and "example embodiment" do not necessarily refer to a single embodiment, although it may, and various example embodiments may be readily combined and interchanged, without departing from the scope or spirit of the present embodiments. Furthermore, the terminology as used herein is for the purpose of describing example embodiments only, and are not intended to be limitations. In this respect, as used herein, the term "in" may include "in" and "on," and the terms "a", "an", and "the" may include singular and plural references. Furthermore, as used herein, the term "by" may also mean "from," depending on the context. Furthermore, as used herein, the term "if" may also mean "when" or "upon," depending on the context. Furthermore, as used herein, the words "and/or" may refer to and encompass any and all possible combinations of one or more of the associated list items.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, well-known structures and components are shown in block diagram form in order to avoid obscuring the concepts of the subject technology.

Currently, all communication with the speakers are handled via e-mail. This may include event information containing logistics of upcoming programs, PowerPoint presentations that are used to present at programs, and the handling of contracts (e.g. delivery to the speaker, signing and returning to the company, etc.). There is a challenge of speakers remembering their upcoming speaking engagements without diligently keeping track themselves. Similarly, there is additional burden to ensure the latest sanctioned version of the presentation is used. In the life sciences industry, speakers are typically strictly regulated when sharing content with prescribing doctors because of the enormous regulatory risks that can flow from unapproved, uncontrolled content. Presenting misinformation or off-label messaging can result in lawsuits and large fines, as well as disruptions in business operations. It is important that HCPs have access to the current up-to-date materials with approved, compliant content. With the volume of communication and program details to keep track of, there is a need for an integrated interface where information and regulated, approved content is consolidated for convenience of access.

In disclosed embodiments, intelligent and flexible updating of records may be provided within the customer relationship management subsystem, including such approaches as communicating with third-party systems and sources in order to verify and update customer information in an effective and timely manner, such as by using the collective information gained by managing a cloud-based system/Software-as-a-Service (SaaS) system on behalf of multiple company customers for the disclosed embodiments.

Figure 1:
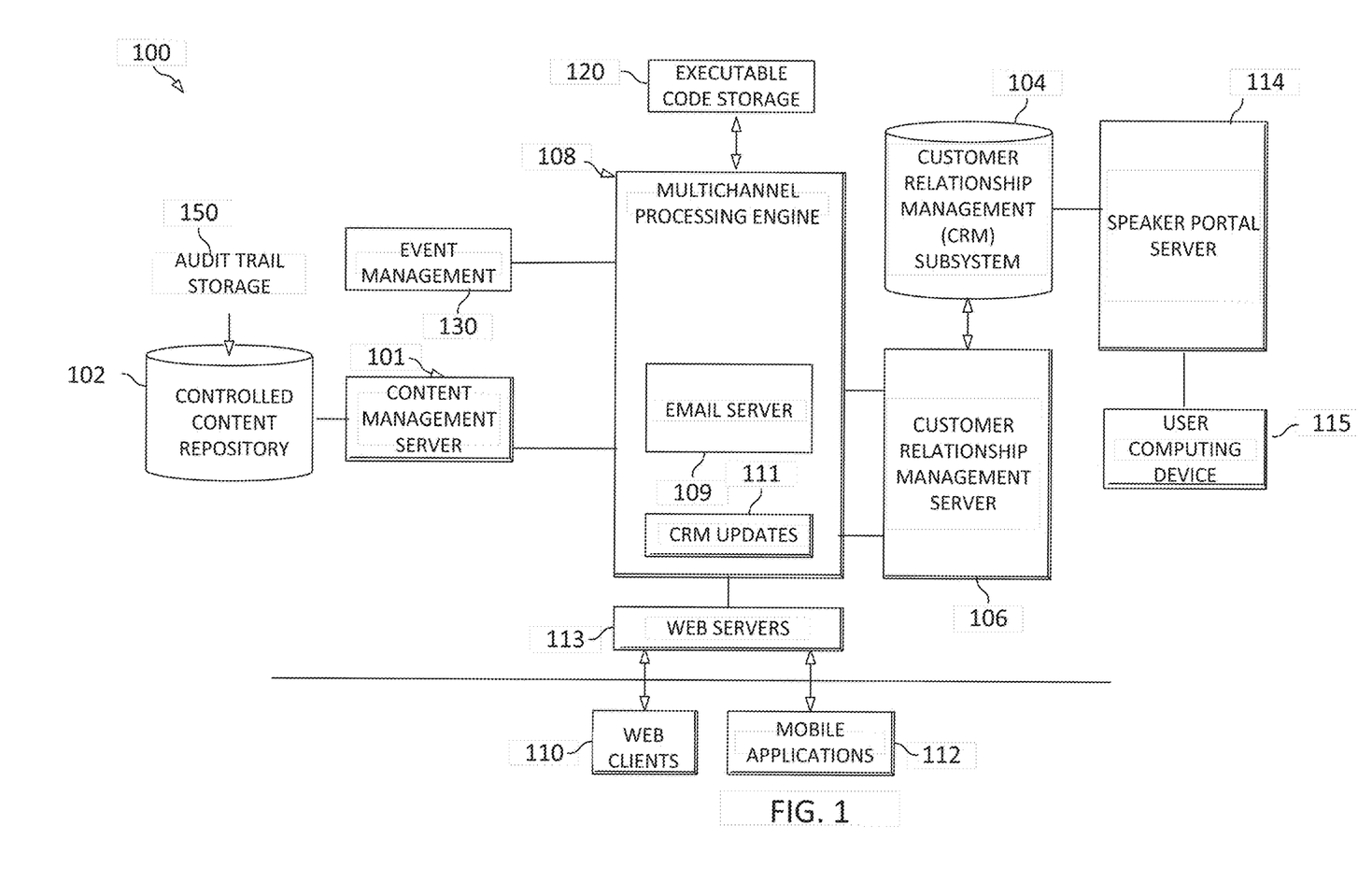
FIG. 1 illustrates an example architecture for an integrated speaker portal for managing peer-to-peer events.

FIG. 1 is a system overview illustrating an embodiment of an event data management system 100. The presently disclosed embodiment comprises a content management server 101, a controlled content repository 102, a Customer Relationship Management (CRM) server 106, a multichannel processing engine 108, an event management controller 130, and a speaker portal server 114. The customer relationship management server 106 may provide access to a customer relationship management subsystem 104, and the multichannel processing engine 108 may be coupled to the content management server 101, the CRM server 106, and the event management controller 130. In one embodiment, the customer relationship management subsystem 104, and/or the email server 109 may be operated by a third party. The multichannel processing engine 108 may be accessed by users such as company sales representatives through web clients 110 or through mobile apps 112 (such as iOS, Android, Blackberry, or Windows Mobile systems) in user computing devices, communicating with the multichannel processing engine 108 through web servers 113. Although the users may be described in the present application as being life science webinar speakers and company event organizers, this particular described embodiment is not intended to limit the generality of the claims that may eventually issue in patents stemming from the present disclosure.

The controlled content repository 102 is designed to have a process for developing approved content that is sharable across multiple users, such as shareholders, reviewers, managers, marketing personnel, physicians, sales representatives, etc. The content generated in the controlled content repository 102 may be accessed on a regulated basis. This regulated basis may be determined, in part, by the company as a whole and additionally by interaction with data from the customer relationship management subsystem 104, described in further detail below. In one embodiment approved content, customer profile information, customer preferences, and regulatory limitations and requirements may be stored in a table in the controlled content repository 102. In addition to storage and development of content, the controlled content repository 102 may also store an audit trail, tracking exact content of communications as they were sent by the user, as well as metadata about webinars regarding the content shared with customers.

The customer relationship management subsystem 104 contains all professional information of HCPs that may be available to users, including contact information, licensing information, areas of practice, and specialties. In addition, the customer relationship management subsystem 104 may also be capable of storing configurations regarding specific preferences, regulatory limitations and requirements, and other fields that will facilitate the generation and maintenance of appropriate approved event content and data, in general or on a by-recipient basis. These preferences and/or requirements include both the preferences of the user (e.g., maintaining account lists) as well as the preferences of the enterprise (e.g., employers of the users), discussed in further detail below. In some examples, the approved content may be pre-processed and stored in the controlled content repository 102 and provided to the multichannel processing engine 108 and the customer relationship management subsystem 104 for access via the speaker portal interface and during a webinar. In other examples, the customer relationship management subsystem 104 may have a content management subsystem and may provide the approved content. The customer relationship management subsystem 104 may store event related data, e.g., a link to approved content in the controlled content repository 102, a speaker list, upcoming and past event date/time/locations/topics, content associated with each event, content sharing rules allowing access to content based on speaker qualifications, contracts associated with an associated speaker, and webinar tracking information as will be described in detail below.

In one embodiment, the event related data, e.g., a link to approved content in the controlled content repository 102, a speaker list, upcoming and past event date/time/locations/topics, content associated with each event, content sharing rules allowing access to content based on speaker qualifications, contracts associated with an associated speaker, and webinar tracking information may be stored in the controlled content repository 102.

In this embodiment, the customer relationship management subsystem 104 is capable of communication with multiple sources the through customer relationship management server 106 or through other channels to maintain a current and accurate collection of information regarding customer accounts. The interface with the multiple sources can be, for example, through an Applications Programming Interface or API, as the API interface will allow compatibility with a flexible array of third-party provider servers. The information being updated may include, but is not limited to, licensing information, area of practice, and location of the various customer contacts. In this manner, the customer relationship management subsystem 104 pulls the approved version of what represents an account or physician, which then pulls from multiple networks to ensure that the information regarding an account is up-to-date.

With further reference to the customer relationship management subsystem 104, this system may be a cloud-based customer database that provides a central access to store and distribute consistent data across customer companies as well as their possible third-party partners and agencies that are used to keep this data updated. This system can provide standard data formats and provide an easy and automated way for customers to have access to coordinated and frequently updated CRM data and to use that coordinated data for sending approved electronic communications, e.g., webinar invitations, in accordance with the system described herein.

In an embodiment, the speaker portal server 114 is responsible for combining the HCP account information from the customer relationship management subsystem 104 with content available from the controlled content repository 102 in advance and/or real-time during an event. Within the customer relationship management subsystem 104, HCP accounts may be assigned a set of alignment rules which determine specific pieces of content available for use from the controlled content repository 102. The speaker portal server 114 may apply these rules and supply the user with a list of approved pieces of content that may then be shared during a webinar.

An speaker portal server 114 may control the process to be described with FIG. 3 below, including creating admins and registered users; accessing events and related data; accessing and downloading permissioned content; accessing and downloading contracts; getting an event approved, sending webinar invitations, starting a webinar and collecting data to update the CRM subsystem 104 during the webinar. The event management controller 130 may store event related information, such as information about attendees and speakers, event content, and event details. The user may access the speaker portal server 114 through a user computing device 115. The user computing device 115 may be any machine or system that is used by a user to access the speaker portal server 114, and may be any commercially available computing devices including laptop computers, desktop computers, mobile phones, smart phones, tablet computers, netbooks, and personal digital assistants (PDAs).

In another implementation, the speaker portal server 114 may be a part, or the functions performed by the customer relationship management server 106. In another implementation, the speaker portal server 114 may be a part, or the functions performed by the content management server 101.

Executable code comprises computer readable instructions stored on the computer readable medium (the code storage medium 120). The executable code storage 120 is in communication with the various computing machines in the system 100 such as the customer relationship management server 106 and the multichannel processing engine 108. The same or another executable code storage 120 may be accessed by the previously described components of the controlled content repository 102 for providing separate computer readable code for operating upon by processing machines in that system. In all cases, the code is programmed to perform the functions that are described in the present embodiments and/or additional functions according to system design needs.

Communication between the multichannel processing engine 108 and the customer relationship management subsystem 104 may occur via the customer relationship management server 106, which acts as an interface between the two. The customer relationship management server 106 may act solely as an entry and exit point for the customer relationship management subsystem 104. The user may access the multichannel processing engine 108 through either a Web Client 110 or through the mobile apps 112 (such as IOS, Android, Blackberry, or Windows Mobile systems).

Figure 2:
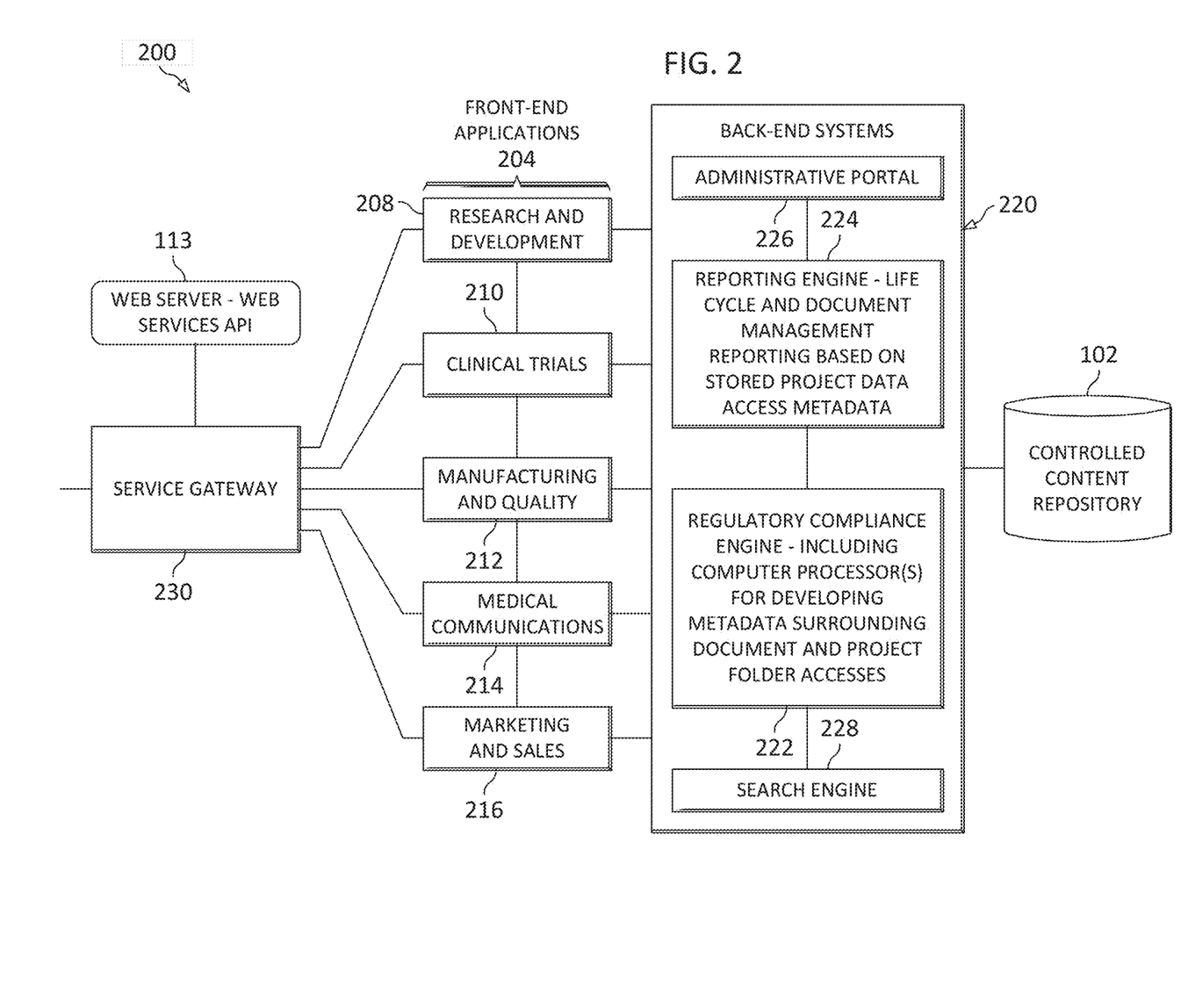
FIG. 2 illustrates an example architecture for the content repository of FIG. 1 in which content is built and organized in a controlled manner that facilitates efficient content generation and alignment.

FIG. 2 provides a description of the controlled content repository 102 with additional specific applications and interfaces connected thereto. In an embodiment, this controlled content repository 102 is a cloud-based or distributed network-based system for consolidating an enterprise's data, oftentimes integrating multiple content repositories in an enterprise into a single system having coordinated control, measuring, and auditing of data creation, access and distribution.

In an embodiment of the controlled content repository 102 for the life sciences industry, as illustrated in the figure, this repository 102 can include specific data collections for the following areas and/or business process-specific front-end applications 204:

The Research & Development (R&D) front end application 208 provides for an aggregation of materials in support of research and initial clinical trial submissions through building organized and controlled content repositories within the controlled content repository 102. Elements that can be stored, organized, and managed through this front end include submission bills of materials. Drug Information Association (DIA) reference models support, and submission-ready renderings. This front end 208 is designed to provide an interface to the controlled content repository 102 whereby researchers, contract research organizations (CROs), and other collaboration partners can access and/or distribute content through a single controlled document system.

The clinical trials front-end application 210 provides for faster and more organized access to trial documents and reports, while supporting seamless collaboration between sponsors, CROs, sites, investigators and other trial participants. Specific features both case study and site administration as well as support the DIA trial master file (TMF) reference model. Having this front-end application providing access to the controlled content repository 102 further provides for efficient passing off of controlled content repository content between this phase and other phases of the life sciences development process.

The manufacturing and quality application 212 enables the creation, review, approval and distribution of controlled documents across the organization and with external partners in the context of materials control and other manufacturing elements. The application 212 provides functionality in support of the manufacturing process including watermarking, controlled print, signature manifestation and "Read and Understood" signature capabilities. The documents and metadata associated with this process is managed and stored in the controlled content repository 102 whereby it can be assured that the related documents are not distributed in contravention of law and company policy.

The medical communications application 214 provides for communications with medical facilities, including call center access, integration, and interface functionality. Particular access control features and metadata associated with this application 214 include expiration and periodic review elements, multi-channel support, global documents and automatic response package generation through the controlled content repository 102.

The marketing and sales application 216 provides an end-to-end solution for the development, approval, distribution, expiration and withdrawal of promotional materials. Specific features include support for global pieces, approved Form FDA 2253 (or similar international forms) form generation, online document, content to be shared during a webinar, and video annotation, and a built-in digital asset library (DAL). Again, the communications may be through the controlled content repository 102.

In disclosed embodiments, there are provided a number of back-end system applications 220 that provide for the management of the data, forms, and other communications in the controlled content repository. For example, the back-end systems applications 220 may include a regulatory compliance engine 222 to facilitate regulatory compliance, including audit trail systems, electronic signatures systems, and system traceability to comply with government regulations, such as 21 CFR Part 11, Annex 11 and GxP-related requirements. The regulatory compliance engine 222 may include processors for developing metadata surrounding document and project folder accesses so from a regulatory compliance standpoint it can be assured that only allowed accesses have been permitted. The regulatory compliance engine 122 may further includes pre-validation functionality to build controlled content in support of installation qualification (IQ) and/or operational qualification (OQ), resulting in significant savings to customers for their system validation costs.

In further disclosed embodiments, the back-end systems 220 may contain a reporting engine 224 that reports on documents, their properties and the complete audit trail of changes. These simple-to-navigate reports show end users and management how content moves through its life cycle over time, enabling the ability to track 'plan versus actual' and identify process bottlenecks. The reporting engine may include processors for developing and reporting life cycle and document management reporting based on stored project data and access metadata relative to documents, forms and other communications stored in the controlled content repository 102.

In one embodiment, the back-end systems 220 may track and display metrics including, but not limited to: number of active speaker portal organizations, active speaker portal accounts, unique logins, event page views, content page views, contract page views, click-throughs, presentation files downloaded, contracts downloaded. The data may be listed in table format or displayed in a graph.

In further disclosed embodiments, the back-end systems 220 can include an administrative portal 226 whereby administrators can control documents, properties, users, security, workflow and reporting with a simple, point-and-click web interface. Customers also have the ability to quickly change and extend the applications or create brand new applications, including without writing additional software code.

In further disclosed embodiments, the back-end systems 220 may include a search engine 228 whereby the controlled content repository 102 can deliver simple, relevant and secure searching.

In providing this holistic combination of front-end applications 204 and back-end system applications 220, the various applications can further be coordinated and communicated with by the service gateway 230, which in turn can provide for communications with various web servers and/or web services APIs 113. Such web servers and/or web services APIs 113 can include access to the content and metadata layers of some or all of the various applications 204 and systems 220, enabling seamless integration among complementary systems.

In the context of the described embodiments, the particular features and capabilities integrate with the other elements of the event management system 100 such that particular features are usable within the various user screens. For example, and without limitation to any other possible combination of features, in the below-described description of a webinar in the life science industry, the above-described search portal can be used to search for approved content within the controlled content repository 102 which may be then be shared during a webinar. And the synergy of combining these particular systems is that the generation of the controlled content can be done in a controlled fashion such that the approved content can be sent to customers with greater confidence in the integrity of the data being sent.

Figure 3A:
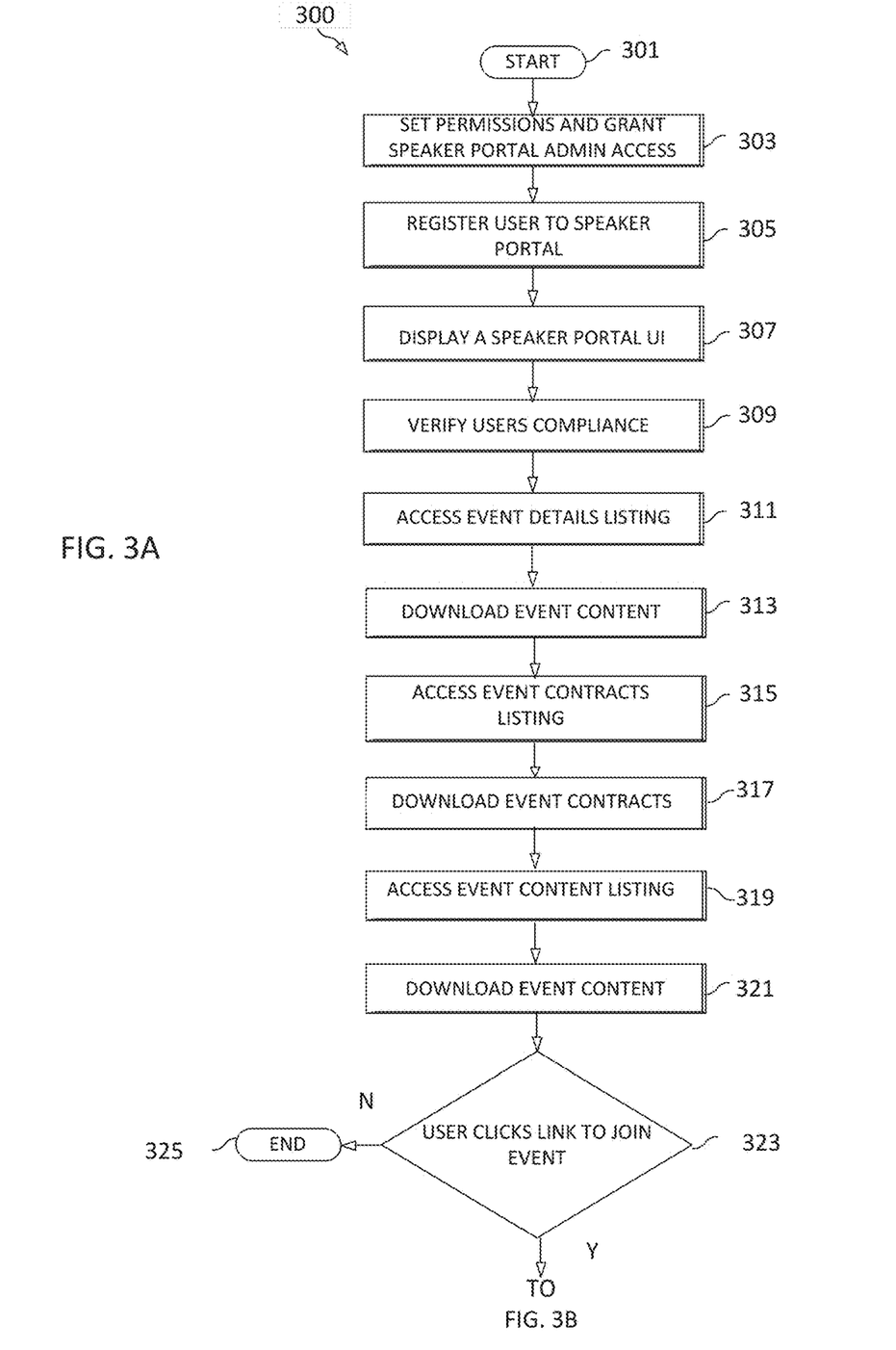
FIGS. 3A and 3B illustrate an exemplary flowchart of a method for managing speaker events using an integrated speaker portal interface.
Figure 3B:
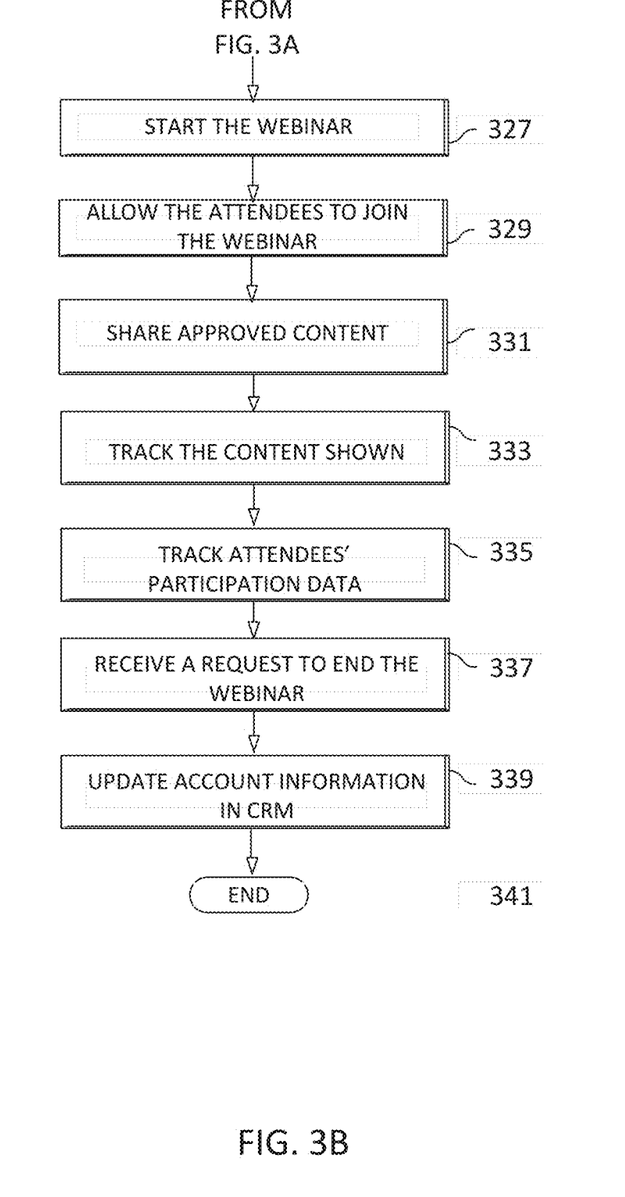

FIGS. 3A and 3B illustrate a flowchart of a method for managing a peer-to-peer speaking engagement(s) using an integrated speaker portal interface according to one embodiment of the present invention. The process may start at 301.

At 303, speaker portal admin access may be granted to an administrative user of a customer (e.g., an administrator or event coordinator for a pharmaceutical company). Assigning admin rights to the administrative user may grant certain permissions and allows the administrative user ability to perform specific admin functions such as, but not limited to: registering and managing a list of users as speakers, troubleshooting user issues, testing user permissions to ensure there are no compliance issues, and ensuring only authorized users have the ability to upload approved, controlled content. An administrative user with admin rights may have the option to login as any user previously registered as a speaker. When an administrative user with admin rights is logged in as a speaker, a message may display with the speaker's name and username. The event detail page depicted in FIG. 4, the contracts page depicted in FIG. 5, and the content page depicted in FIG. 6, may display data and content associated with the speaker as if the speaker was logged in.

At 305, the administrative user (e.g., an event coordinator for a pharmaceutical company) with admin rights triggers an invitation to a recipient (e.g., HCP) to register as a speaker. This is typically performed after the recipient executes their first contract with the customer for a speaking engagement. The invitation may be an email generated by the email server 109. In one implementation, a unique identifier may be generated for each recipient and included in his/her invitation. In another implementation, the unique identifier may be a unique URL for each recipient. The unique identifier may incorporate the speaker ID and/or customer organization ID. For instance, a pharmaceutical company may have separate organizations for respective regions (e.g., Company China. Company LATAM, Company NA, etc.). In one embodiment, the data in the URL may be masked to be illegible for humans.

In one implementation, the email server 109 may be an approved email generation controller and the invitation may be sent via an approved email generated by the email server 109, as described in U.S. Pat. No. 9,055,023, entitled System and Method for Controlling Electronic Communications and issued on Jun. 9, 2015, which is hereby incorporated by reference herein for all purposes.

Recipients may receive their invitations, including the unique links, in their inboxes. When a recipient clicks on his/her link, the recipient may be directed to a registration page where new users can create an account. Upon successful registration, the date and time of the speaker portal account creation for the recipient may be recorded and stored in the CRM subsystem 104.

Figure 4:
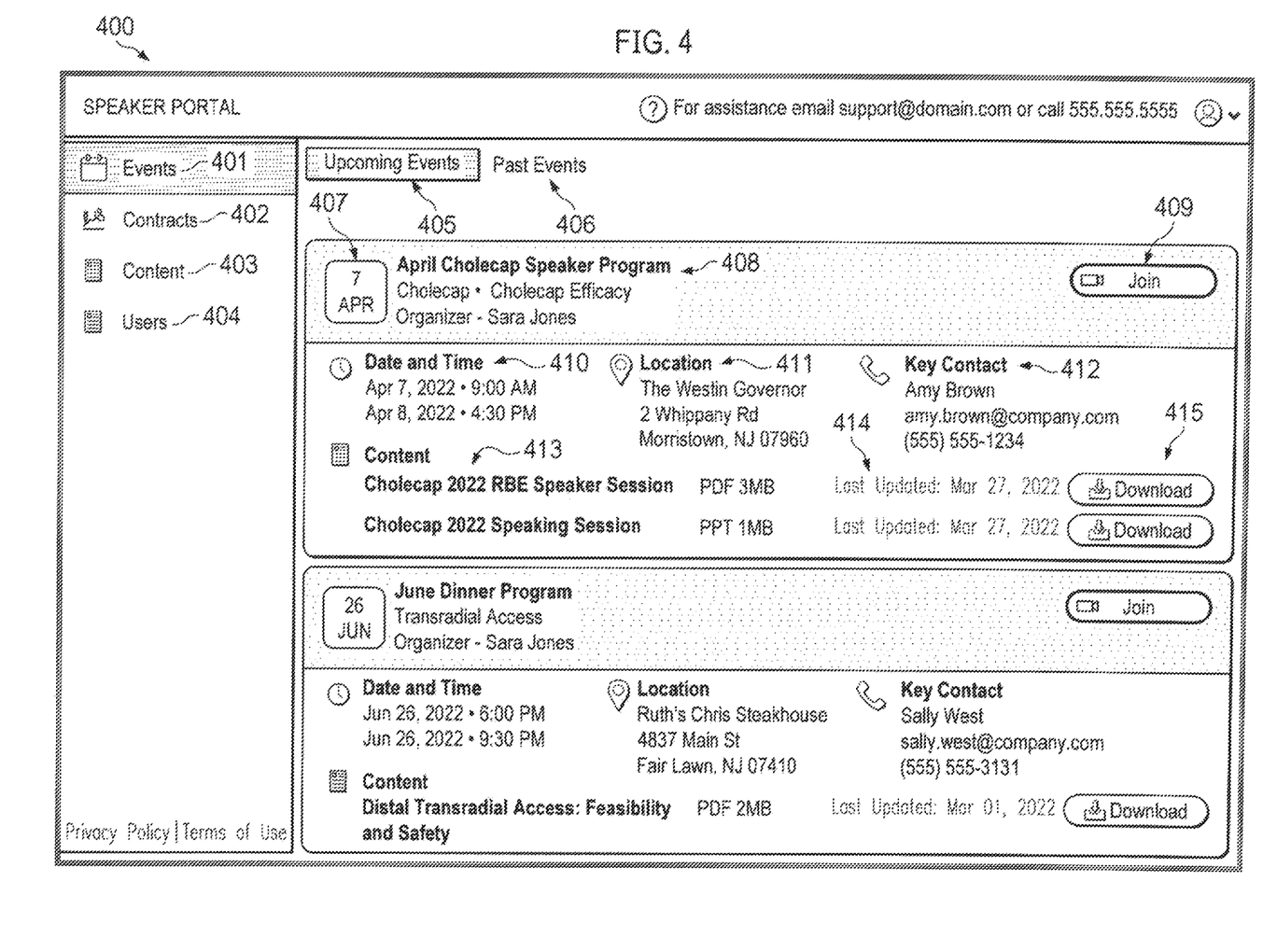
FIG. 4 illustrates an example of accessing event details on a user interface for managing speaker events.

At 307, an exemplary speaker user interface 400 as depicted in FIG. 4 may be displayed for previously registered speakers (e.g., HCPs) to manage their contracted speaking event(s). In one implementation, the speaker user interface 400 may have areas for receiving input from the speaker. As shown, the speaker user interface 400 may access and display information and content from the CRNM subsystem 104 and controlled content repository 102.

In one implementation, the event management system 100 is built on the CRM system and the content is stored in the controlled content repository 102. In one embodiment, the CRM system, which includes the CRM server 106 and the CRM subsystem 104, may be built on the content management system, which includes the content management server 101 and the controlled content repository 102. When the administrative user is in the CRM system and created a new topic, or a new event type, the new topic and/or new event type may be automatically pushed to the controlled content repository 102. The content in the controlled content repository 102 may be associated to the topic or event type based on, e.g., relevancy indicated by metadata. When the speaker is in the controlled content repository 102, and has content associated with their account, he/she may be able to choose which event types, and/or topics this content is related to. In one implementation, the multichannel processing engine 108 may bring the content in the controlled content repository 102 to the CRM subsystem 104 and the speaker portal server 114 may associate the content to the event. In one implementation, the controlled content and event may be automatically associated in the CRM subsystem 104. The CRM subsystem 104 may contain the event details (e.g., date, time, topic, etcd, and event contracts associated with a given event. Based on this data in the CRM subsystem 104 associated with a speaker, the CRM subsystem 104 may determine which controlled content to associate with an event.

In one implementation, rules for associating the content to the right event and topic may be built up in the speaker portal server 114. One example of the rule may be, e.g., when an event is about this topic, use this content. Thus, when an administrative user creates an event and provides event type of topic, the CRM server 106 may check the rules and pull the right content from the controlled content repository 102 via the multichannel processing engine 108.

In another embodiment, the storage and development of content in the controlled content repository 102 may include a medical, legal, and regulatory (MLR) review process. During MLR review, material and content is examined and verified for truth, accuracy, compliance, and clarity. Inaccurate messages are illegal and can result in exorbitant fines and time-consuming audits in the life sciences industry. To ensure compliance with rules and regulations, content successfully passing MLR requirements is managed and stored in the controlled content repository 102.

At 309, a speaker's compliance with previously pre-defined rules and/or settings is verified. In one implementation, when a potential speaker (e.g., HCP) signs an initial contract with a customer (e.g., a pharmaceutical company) to become a speaker, they can be given two types of training: general compliance training and topic training. In general compliance training, a potential speaker may be educated on a variety of situations, such as how to handle particular questions, what to do for off label messages, what the speaker can and cannot talk to, etc. The general compliance training may be managed by the controlled content repository 102. The second type of training may be specific to the presentations the potential speaker is contracted to speak on behalf of the customer. This can include technical details related to the content covered by the presentation for the event. The topic training may also be managed by the controlled content repository 102. Upon successful completion of the general compliance training and topic training, the speaker's records are updated in the customer relationship management subsystem 104. The event management server 130 may verify training compliance and based on the status of the speaker's training enable the speaker to access the event presentation content via the speaker portal 400.

At 311, the event details page as depicted in the exemplary user interface 400 in FIG. 4 may be displayed in response to a request. An upcoming events 405 tab may be presented displaying events occurring today or in the future. Past events 406 tab may also be presented displaying events that have already occurred. Important logistical event details and relevant content may be presented. For instance, a month and day 407 for the event; event name, product, topic and event organizer 408; event start/end date and time 410; location 411 where the event is taking place; key contact information 412 for the event. This information screen may also include any presentation/content 413 that is approved for this event, and the last modified date of the content 414. The speaker may click on that presentation, download it, and then practice the content.

At 313, content associated with an event may be downloaded. In one implementation, the previously registered speaker (e.g., HCP) may access the event content from the event details page depicted in FIG. 4 using a dedicated download button 415. When the button is pressed, the associated content may be downloaded using a browser's native download functionality. The content downloaded from the speaker portal may be locked as read-only because it has previously successfully completed the MLR process. Due to the risks (regulatory and otherwise), no modifications to the event content are allowed. The system provides for control of the event content to customers and users alike.

Figure 5:
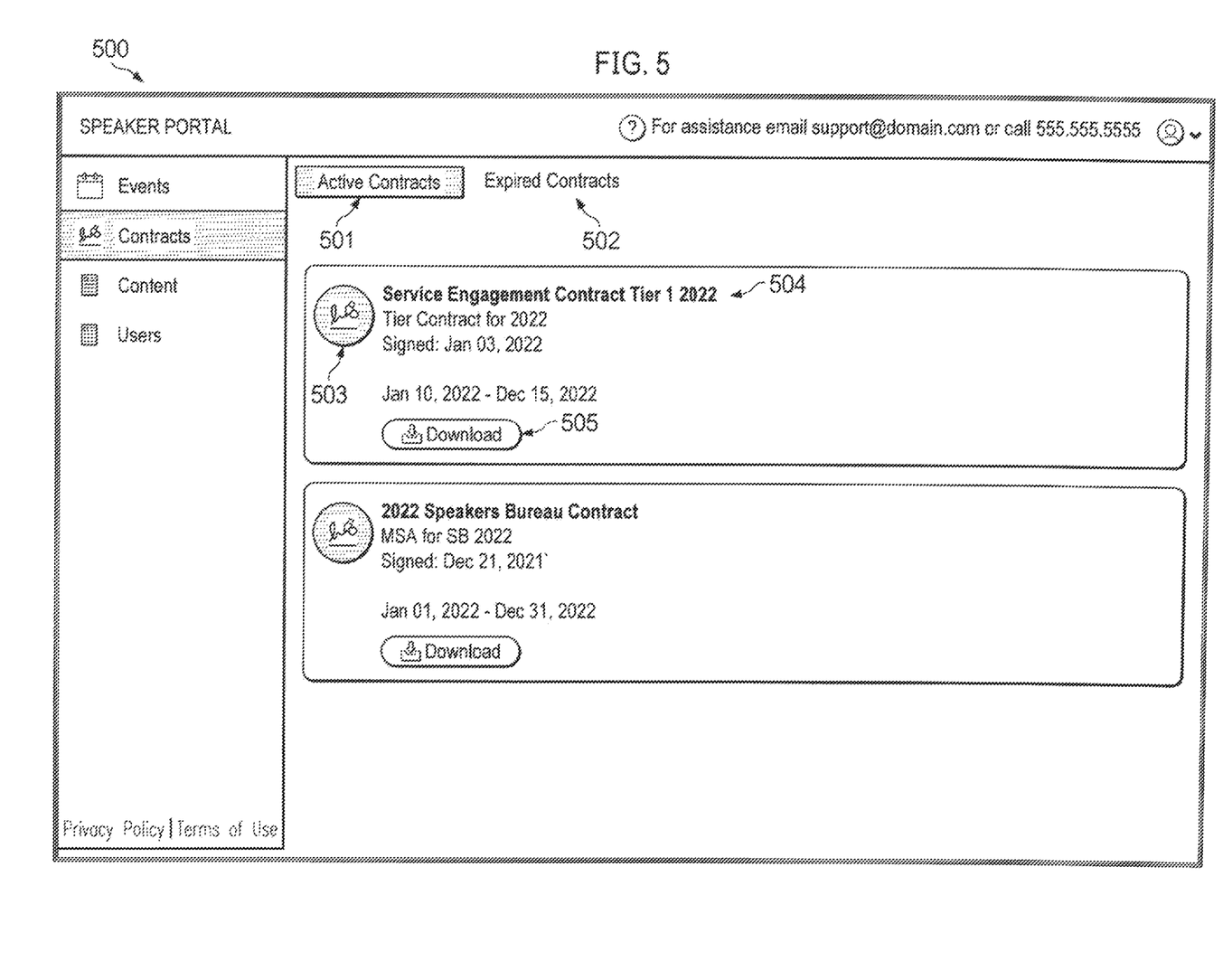
FIG. 5 illustrates an example of accessing contracts on a user interface for managing speaker events.

At 315, the contracts page as depicted in the exemplary user interface 500 in FIG. 5 may be displayed in response to a request. An active contracts tab 501 may be displayed showing any active contracts metadata and contract documents the speaker has with the organization associated with the speaker portal. In one implementation, an expired contracts tab 502 may be displayed showing any expired contracts metadata and contract documents the speaker has with the organization associated with the speaker portal. As depicted in FIG. 5, an icon 503, related contract metadata 504 (e.g., contract filename, date contract was signed, effective date of the contract, etc.) is displayed.

At 317, event contracts may be downloaded using the dedicated button 505 on the event contracts page of the exemplary user interface 500 in FIG. 5. When the download button 505 is pressed, the associated contract documents may be downloaded using a browser's native download functionality.

Figure 6:
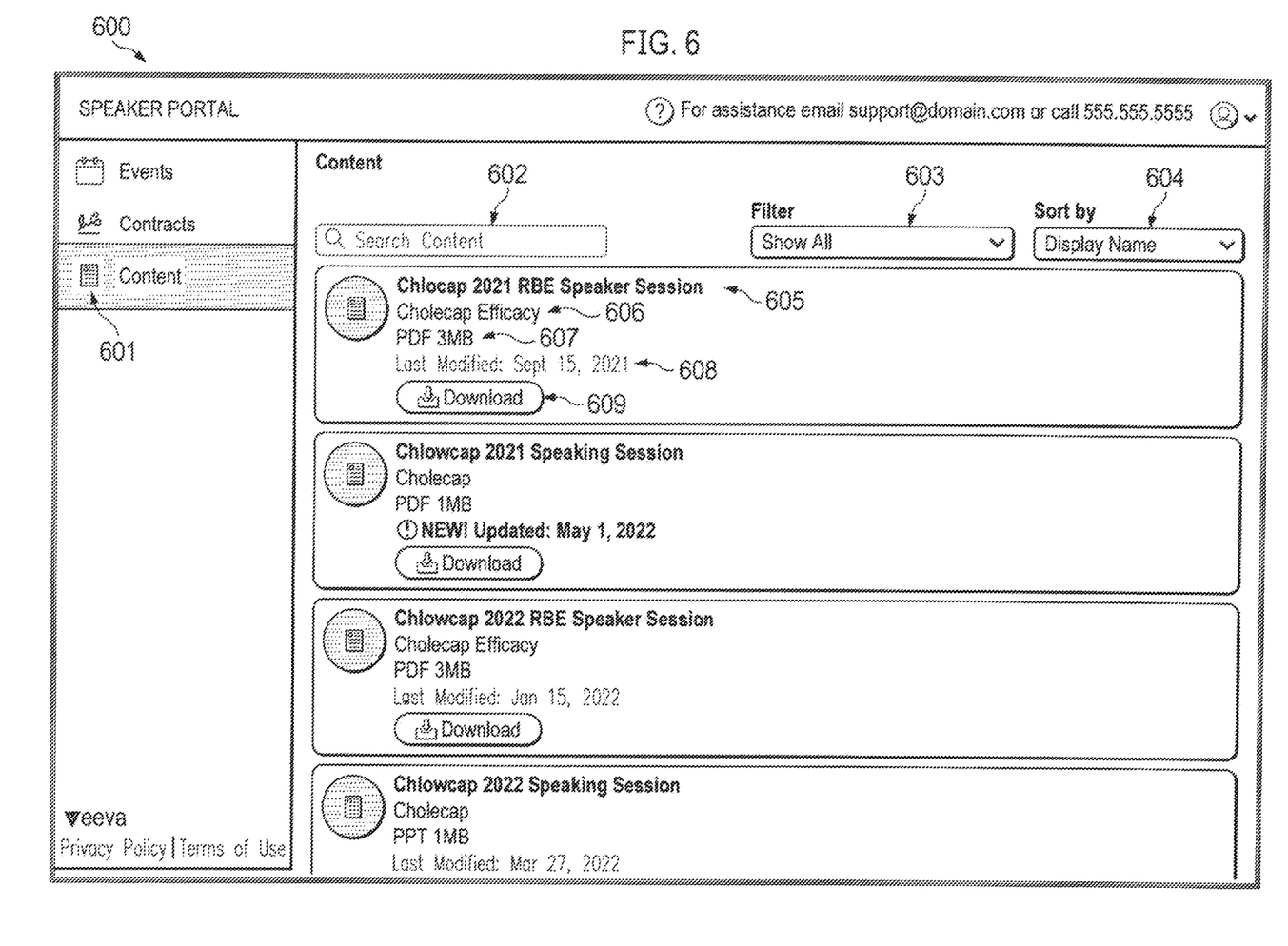
FIG. 6 illustrates an example of accessing content on a user interface for managing speaker events.

At 319, the event content page as depicted in the exemplary user interface 600 in FIG. 6 may be accessed. In one implementation, the speaker may input text and search the controlled content repository 102 using the content search bar 602. The listed content metadata may be filtered using various options in the drop down menu 603, or sorted by various attributes using the drop down menu 604. Content identification details are displayed, such as, but not limited to: associated event name 605, content product or topic name 606, file type and size 607, and date file was last modified 608.

At 321, content associated with an event may be downloaded. In one implementation, the previously registered speaker (e.g., HCP) can access the event content from the content page depicted in FIG. 6 using a download button 609 present in the content page interface 600. When the button is pressed, the associated content may be downloaded using a browser's native download functionality. The content downloaded from the speaker portal may be locked as read-only because it has previously successfully completed the MLR process. Due to the risks (regulatory and otherwise), no modifications to the event content are allowed. The system provides for control of the event content to customers and users alike.

In one implementation, the content downloaded from the speaker portal at 313 may be the same content downloaded from the speaker portal at 321. In another implementation, the content downloaded from the speaker portal at 321 includes any content from both current and past events.

In one implementation, when a new version of the content is uploaded, or the current version is updated, an indicator may be displayed to indicate that a new version is available, so that the speaker can be prompted to download the new version of the content. The content may be coming from the controlled content repository 102. The content management server 101 may check when the speaker loads the event and the version of the content he/she has. If the version on his/her device is not the same as the latest version, the speaker may be informed to get an update. So before the event, the speaker can practice, and download new version of the content that is needed. In one implementation, when a change is made to the content in the controlled content repository 102, the speaker portal server 114 may pick up the change, and push it to the CRM subsystem 104 and the event management client on the speaker's computing device. Consequently, the speaker can get the latest version of the controlled content, and only the latest version of the controlled content will be shared.

At 323, a determination is made whether the user presses the dedicated join event button 415. When the user presses the button, the method may continue with FIG. 3B as will be described below. If the user does not press the dedicated join event button 415, the process ends at 325.

Now referencing FIG. 3B, if the speaker presses the dedicated join event button 415 from the event details page 400 in FIG. 4, the process continues to 327. On the day of the event, the speaker may start a webinar of the event at 327.

At 329, the attendees may join the webinar of the event.

At 331, the speaker may start to share the approved content of the event. In one implementation, when a speaker clicks on "share screen",     the event management controller 130 will only allow the speaker to share the latest approved version of content.
    If the speaker has an old version of the content,
    the event management controller 130 may give him/her a chance to update to the newest version.

In one implementation, when the speaker selects the presentation and starts to share a slide, the slide sorter may be displayed on the side on the screen shared to make it easy for the speaker to move between slides.

At 333, the event management controller 130 may track the content shown, including which slide is showing, for how long, and the order of the slides. The data may be stored in the controlled content repository 102 or the CRM subsystem 104 for auditing purposes. For example, the life science industry is very strict about having the right content displayed, including having the latest version of approved content displayed, and making sure that the correct slide was shown for the proper amount of time. With slide tracking, the system 100 may automatically store data that says. e.g., the speaker spent 3 minutes on the side effect slide and 2 minutes on the dosing slide.

At 335, the event management controller 130 may track the attendees' participation data, e.g., their join and leave times, and store the data in the controlled content repository 102 or the CRM subsystem 104.

The speaker may end the webinar at 337.

At 339, the participants' account information in the CRM subsystem 104 may be updated. In addition to information of the webinar, e.g., its topic, time and location, the updates for an attendee may include when he/she joined, when he/she left and content he/she watched, the updates for a speaker may indicate that he/she spoke at the webinar, and the content he/she shared.

The flowcharts do not mean to limit the sequence of the steps.

While various embodiments have been described above, it should be understood that they have been presented by way of example only, and not limitation. Thus, the breadth and scope of a preferred embodiment should not be limited by any of the above described exemplary embodiments, but should be defined only in accordance with the claims and their equivalents for any patent that issues claiming priority from the present provisional patent application.

For example, the multichannel processing engine 108 is shown to communicate with only one customer relationship management subsystem 104 in the drawings, but it may communicate with more customer relationship management subsystems. For example, as referred to herein, a machine or engine may be a virtual machine, computer, node, instance, host, or machine in a networked computing environment. Also as referred to herein, a networked computing environment is a collection of machines connected by communication channels that facilitate communications between machines and allow for machines to share resources. Network may also refer to a communication medium between processes on the same machine. Also as referred to herein, a server is a machine deployed to execute a program operating as a socket listener and may include software instances.

In all descriptions of "servers" or other computing devices herein, whether or not the illustrations of those servers or other computing devices similarly show a server-like illustration in the figures, it should be understood that any such described servers or computing devices will similarly perform their described functions in accordance with computer-readable instructions stored on a computer-readable media that are connected thereto.

Resources may encompass any types of resources for running instances including hardware (such as servers, clients, mainframe computers, networks, network storage, data sources, memory, central processing unit time, scientific instruments, and other computing devices), as well as software, software licenses, available network services, and other non-hardware resources, or a combination thereof.

A networked computing environment may include, but is not limited to, computing grid systems, distributed computing environments, cloud computing environment, etc. Such networked computing environments include hardware and software infrastructures configured to form a virtual organization comprised of multiple resources which may be in geographically disperse locations.

The approved content may be in any format, e.g., text, audio, video, picture, multimedia, or PDF.

Various terms used herein have special meanings within the present technical field. Whether a particular term should be construed as such a "term of art," depends on the context in which that term is used. "Connected to," "in communication with," or other similar terms should generally be construed broadly to include situations both where communications and connections are direct between referenced elements or through one or more intermediaries between the referenced elements, including through the Internet or some other communicating network. "Network," "system," "environment," and other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

The invention claimed is:

1. A machine-implemented method for implementing and using an integrated speaker portal, wherein the method comprises:
   establishing a controlled content repository, the controlled content repository being securely and controllably accessed;
   establishing an access protocol for providing available approved event content in the integrated speaker portal, wherein the access protocol includes at least one first set of alignment rules that ensure a first user possesses qualifications to act as a speaker;
   obtaining information associated to the first user from an information management system, the information management system facilitating generation and maintenance of approved event content and data, wherein the obtained information associated to the first user from the information management system includes prerequisite training records for the first user, indicating fulfillment status of compliance or general training required to access corresponding controlled content;
   verifying the first user complies with the first set of alignment rules for providing access to available approved event content in the integrated speaker portal using the obtained information including prerequisite training records corresponding to the first user from the information management system;
   obtaining approved event content from the controlled content repository upon verification of the first set of alignment rules;
   aligning the approved event content obtained from the controlled content repository with the obtained information corresponding to the first user from the information management system, wherein the obtained approved event content corresponds to approved event content assigned to the first user satisfying the prerequisite training requirement; and
   displaying a plurality of items on a user interface, wherein at least one of said plurality of items displayed is approved event content from the controlled content repository previously made available to the first user.

2. The method of claim 1, wherein the obtained information associated to the first user from an information management system includes training records associated with a first event.

3. The method of claim 1, wherein the general compliance training includes situational education on laws, regulations or policies, and topic training includes education specific to a first event subject matter.

4. The method of claim 1, wherein the obtained information associated to the first user from an information management system includes contracts for the first user.

5. The method of claim 1, wherein the obtained approved event content includes relevant approved event content associated with an event the first user is contracted to lecture.

6. The method of claim 1, further comprising:
   establishing a second access protocol for the controlled content repository, whereby approved content is stored in the controlled content repository according to the second access protocol and whereby the second access protocol comprises at least one second set of alignment rules for determining if a first item of approved content within the controlled content repository can be made available to the first user.

7. The method of claim 6, wherein the second set of alignment rules is based on one of the following: customer profile information, customer preferences, and regulatory limitations and requirements.

8. The method of claim 6, further comprising:
   verifying the first user complies with the second set of alignment rules for providing access to available approved event content in the integrated speaker portal using the obtained information corresponding to the first user from the information management system;
   obtaining a second approved event content from the controlled content repository upon verification of the second set of alignment rules;
   aligning the second approved event content obtained from the controlled content repository with the obtained information corresponding to the first user from the information management system.

9. The method of claim 1, wherein the information management system is a customer relationship management (CRM) system.

10. The method of claim 1, further comprising: wherein at least a second one of said plurality of items displayed is event details associated with an event the first user is contracted to lecture.

11. The method of claim 1, further comprising: wherein at least a second one of said plurality of items displayed is contract documents executed by the first user.

12. The method of claim 10, further comprising: wherein the plurality of items displayed on the user interface correspond to both upcoming and past events.

13. The method of claim 11, further comprising: wherein the contract documents executed by the first user contain active and expired contracts.

14. The method of claim 1, further comprising: wherein the event details associated with an event the first user is contracted to lecture includes one or more of the following:

a month and day for the event, event name, event start/end date and time, location where the event is taking place, key contact information for the event, presentation/content that is approved for this event, and the last modified date of the content.

15. The method of claim 1, further comprising: wherein the first user downloads the approved event content associated with the event using the speaker portal interface.

16. The method of claim 15, further comprising: wherein the downloaded approved event content is locked in read-only state.

17. The method of claim 1, further comprising: wherein the displayed approved content from the controlled content repository previously made available to the first user includes an indicator to indicate that a new version is available.

18. The method of claim 1, wherein the obtaining of approved event content from the controlled content repository upon verification of the first set of alignment rules can be performed prior to the event in advance, or in real-time during an event.

19. A system for implementing and using an integrated speaker portal, wherein the system comprises:
   a controlled content repository, the controlled content repository being securely and controllably accessed by establishing an access protocol for the controlled content repository, whereby approved content is stored in the controlled content repository according to the access protocol and wherein the access protocol includes at least one first set of alignment rules that ensure a first user possesses the qualifications to act as a speaker;
   an information management system, the information management system facilitating the generation and maintenance of approved event content and data;
   a speaker portal server that determines and verifies the first user complies with the first set of alignment rules for providing access to available approved content in the integrated speaker portal using information obtained from the information management system associated with the first user,
   wherein the obtained information associated to the first user from the information management system includes prerequisite training records for the first user, indicating fulfillment status of compliance or general training required to access corresponding controlled content; and
   wherein the speaker portal server displays a plurality of items on a user interface, wherein at least a first one of said plurality of items displayed is approved event content from the controlled content repository previously made available to the first user.

* * * * *